May 5, 1970  F. E. OTTO  3,510,838
VEHICLE FAST-STOP SIGNAL
Filed March 16, 1967

INVENTOR:
FLOYD E. OTTO

Arthur J. Hanemann
ATTORNEY

United States Patent Office 3,510,838
Patented May 5, 1970

3,510,838
VEHICLE FAST-STOP SIGNAL
Floyd E. Otto, 3508 Spring St., Racine, Wis. 53405
Filed Mar. 16, 1967, Ser. No. 623,664
Int. Cl. B60q 1/26
U.S. Cl. 340—71    4 Claims

ABSTRACT OF THE DISCLOSURE

A vehicle fast-stop signal having a stop indicator lamp and an inertia switch, with both electrically connected to the stop light electric circuit of a vehicle. The inertia switch is arranged to move to a closed position upon deceleration of the vehicle, and the electric circuitry holds the switch closed as long as the vehicle brake mechanism is being applied and the electric circuit for the stop light is being energized. An electric switch in the vehicle stop signal circuitry is closed while the brake mechanism is being actuated, and this switch then maintains the inertia-actuated switch in the closed position, through enertia and a solenoid.

BACKGROUND OF THE INVENTION

This invention relates to a vehicle fast-stop signal which combines the action of vehicle deceleration and of manual actuation of the brake mechanism.

The prior art has examples of vehicle signals which indicate that the vehicle is being rapidly decelerated, that is, being brought to a fast stop. These prior art signals are generally operative in response to either the manual braking action or to the effect of inertia created by deceleration of the vehicle. Further, in some instances the signal is applied in connection with the already-existing and/or conventional vehicle stop lights, and in other instances additional stop lights are provided. In most of these prior art teachings, elaborate switches, inertia-responsive members, electric circuitry, and lamps are required.

Still further, in these prior teachings, the apparatus requires either extraordinarily high braking effort or extremely rapid deceleration in order for the fast-stop signal to be operative. In still other instances, only moderate deceleration, such as might be caused without any braking effort, will cause the fast-stop signal to be operated.

The present invention is an improvement on the systems heretofore known, and, more specifically, it answers the aforementioned problems and provides a vehicle fast-stop signal which consistently, reliably, and sensitively indicates that a vehicle is being brought to a fast stop.

Still more specifically, the present invention provides a fast-stop vehicle signal which is operative when the vehicle is being both rapidly decelerated and subjected to mechanical braking. That is, the signal is operative when the operator has manually applied the brakes, such as by depressing the vehicle brake pedal, and also the vehicle decelerates a predetermined amount. Thus, manual braking alone, and deceleration alone will not activate the signal.

Still further, the present invention provides that once the signal is operating, then release of the manual braking effort, such as release of the brake pedal of the vehicle, will turn the signal off. Thus, the signal is normally disposed to the rear of a vehicle, such as the conventional stop lights now employed on automobiles, and anyone to the rear of the vehicle will immediately know when the vehicle is being brought to a rapid stop by the combined minimum degree of deceleration and by the application of the manual braking effort. Still further, anyone behind the vehicle will also immediately know when the brake mechanism has been released, since at this time the fast-stop signal will be likewise turned off.

DESCRIPTION OF THE PREFERRED EMBODIMENT

Figure 1:
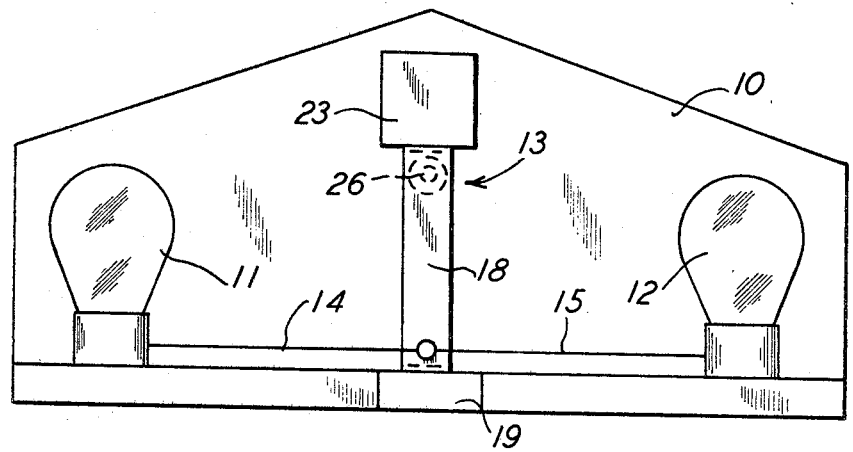
FIG. 1 is a rear elevational view of certain parts of this invention.

A housing or support 10 is shown in FIG. 1 to encompass two lamps 11 and 12 and an inertia switch generally designated 13. The lamps 11 and 12 may be of a common electrical type, and they are suitably mounted on the housing 10 to be grounded therewith and thereby be electrically operative when the housing 10 is mounted on a vehicle, such as a conventional automobile. Preferably, the housing 10 would be mounted to the rear of the automobile so that the lamps 11 and 12 would be visible to the rear for indicating the fast-stop action.

Figure 2:
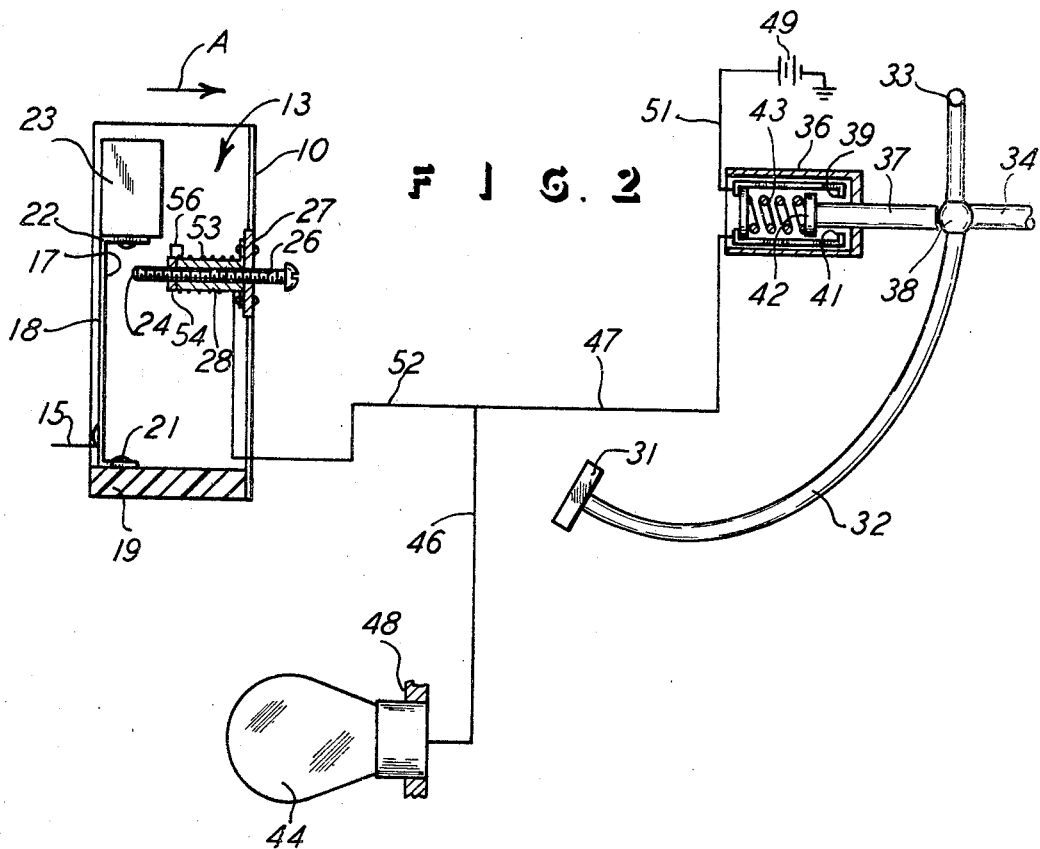
FIG. 2 is a side view of parts shown in FIG. 1, with other parts added thereto, and with the view being partially diagrammatic.

Electric circuitry, such as wires 14 and 15 extend between the lamps 11 and 12 and the inertia switch 13. FIG. 2 shows the lamp wire 15 connected to a contact 17 of one side of the inertia switch 13. The contact 17 includes a flat spring 18 mounted on an insulation piece 19 supported in the housing 10. The spring 18 is then secured by means of a rivet 21, so the lower end of the spring 18 is fixed, but the upper end 22 is free to move in the fore-and-aft direction of the vehicle, that would be to the left and right in FIG. 2. The arrow designated A in FIG. 2 indicates the forward vehicle direction to be to the right.

A weight 23 is affixed to the spring upper end 22, and the weight provides the desired flexing of the spring 18 in response to inertia forces acting on the weight 23 and the spring 18.

The inertia switch 13 has another electric contact 24 and this is shown to be in the form of a screw 26. An insulation bushing 27 mounts the screw 26 on the housing 10, and a screw supporter 28 is threaded for receiving the screw 26. Of course the screw can be adjusted axially toward and away from the spring 18 and its contact point 17. Thus it will be understood that the strength of the spring 18 is such that it will normally remain upright, as shown in FIG. 2, but it will also flex under the force of inertia as created by deceleration of the vehicle. Such flexing will cause the contact 17 to abut the contact 24, and the spring 18 is of an electric conducting material, such as spring steel. Of course the degree of deceleration required and desired for making electrical contact as described will depend upon the axially adjusted setting of the screw 26. Such adjustment is therefore available to the vehicle operator.

The conventional brake mechanism is shown to include the brake pedal 31, brake arm 32, and its pivot point or arm 33, which is suitably mounted in the vehicle. A connector 34 extends to the brake mechanism, such as the hydraulic master cylinder usually employed in the modern day automobile, but such cylinder is not shown herein. Also of conventional construction is an electric switch 36 which has a plunger arm 37 in contact with a connector section 38 of the brake pedal arm 32. The switch 36 has its contact points 39 and 41 disposed therein and aligned with the path of a connector 42 on the plunger 37. A compression spring 43 is also disposed within the switch 36. Thus, in a conventional arrangement and functioning, upon depressing the pedal 31, the switch plunger 37 is permitted to move to the right in FIG. 2, and the connector 42 makes electrical contact across the switch points 39 and 41 to place the switch 36 in the closed position. Such action energizes the vehicle conventional stop lights, such as the shown light 44. Electric circuitry, such as the electric cables 46 and 47, connect the switch 36 with the lamp 44. Also, the lamp 44 is shown mounted in the vehicle fragment designated 48, so the lamp is desirably grounded in the vehicle for completing the electric circuit throughout the vehicle, as indicated in the vehicle portion designated 48.

Further, the vehicle battery, indicated 49, is connected to the switch 36 by the wire 51. Finally, electric circuitry, such as the wire 52, also connects the switch 36 with the inertia-responsive switch 13. The wire 52 is thus shown to have its end 53 wound around the threaded piece 28, and the latter is electrically energized. Also, the piece 28 and screw 26 act as a solenoid to hold the contacts 17 and 24 closed when the switch 36 is closed. Finally, the wire 52 is electrically connected to the screw 26, by the shown electrically conductive nut 54 and wire end 56, to complete the electric circuit. Thus, the electric circuit formed by wires 15 and 52 is an additional electric circuit, compared to the electric circuit for stop lights 44, and the additional electric circuit presents the two branches 15 and 52 for connection to the switch 13.

The strength of the spring 18, and the energy in the electric circuit described, are such that upon adequate deceleration of the vehicle, the spring 18 will flex to where the contact 17 touches the contact 24. This places the inertia switch 13 in the closed position, and, when the switch 36 is also in the closed position, then the fast-stop lamps 11 and 12 are energized to signal that the vehicle is being brought to a fast stop. The switch 13 will be retained in the closed position as long as the switch 36 remains closed, and that is of course when the brake pedal 31 is being depressed sufficiently to close the switch 36 and such depressing action is of the conventional and well-known type for energizing the conventional vehicle stop lights 44. Only when the switch 36 is closed will the lamps 11 and 12 be energized. Also, as long as the switch 36 remains closed, the switch 13 will remain closed, since solenoid 28 remains energized and its tip 24 is in contact with spring 18, and the lamps 11 and 12 will be energized. Finally, only when the switch 36 is open, will the lamps 11 and 12 not be energized. Therefore, deceleration alone will not cause the lamps 11 and 12 to be energized, and actual energizing of the lamps 11 and 12 is in complete response to the movement of the brake pedal 31.

What is claimed is:
1. In a vehicle signal of a fast stop for use in a vehicle, a brake pedal, an electric switch actuated by said brake pedal to be in the closed position when said brake pedal is depressed and to be in the open position when said brake pedal is released, an electric lamp, a battery, electric circuitry connecting said switch and said lamp and said battery for energizing of said lamp upon depressing said brake pedal to actuate said switch, an additional electric lamp, additional electric circuitry connecting said electric switch and said additional electric lamp, an inertia-actuated electric switch interposed in said additional electric circuitry and having a switch-open position and a switch-closed position and arranged to be mountable in a vehicle to be inertia-responsive to deceleration of the vehicle for actuating said inertia-actuated electric switch to said switch-closed position, said inertia-actuated electric switch including two electric contacts and said additional electric circuitry being electrically separated into two branches at said inertia-actuated electric switch and each of said two branches being separately electrically connected to respective ones of said two electric contacts, at least one of said two electric contacts being movable into an electrically closed position with the other of said two contacts in response to inertia forces for alternate electric opening and electric closing of said inertia-actuated switch, the improvement comprising a solenoid electrically connected with one of said two branches to be electrically energized through said additional electric circuitry, said solenoid constituting one of said two contacts and beings positioned to be in contact with the other of said two contacts, when said contacts are moved into said closed position, and said solenoid being arranged to hold said contacts closed while said additional circuitry is energized.

2. The subject matter of claim 1, wherein said inertia-actuated switch includes a movable support for positioning a movable one of said contacts and for yieldingly urging said movable one of said electric contacts away from the other of said electric contacts and in the direction opposite to that induced by the inertia forces in the deceleration of the vehicle.

3. The subject matter of claim 2, wherein said movable support includes a spring and a weight, said spring being adapted and disposed to position said movable one electric contact into abutment with said other electric contact to close said inertia-actuated switch, and said spring being of a strength only sufficient to remain in a position for said inertia-actuated switch to be closed only while the first said electric switch is closed and said solenoid is being energized.

4. The subject matter of claim 2, including an adjustable mounting for one of said electric contacts for selective movement toward and away from the other of said electric contacts.

References Cited
UNITED STATES PATENTS

| | | | |
|---|---|---|---|
| 1,625,017 | 4/1927 | Birkholz | 340—262 XR |
| 3,108,252 | 10/1963 | Torres | 340—71 |
| 3,332,060 | 7/1967 | Liljequist | 340—71 |

ALVIN H. WARING, Primary Examiner

U.S. Cl. X.R.
200—61.45; 340—262